United States Patent [19]

Sugio et al.

[11] Patent Number: 4,532,306

[45] Date of Patent: Jul. 30, 1985

[54] POLYPHENYLENE ETHER RESIN COMPOSITION

[75] Inventors: Akitoshi Sugio, Ohmiya; Masao Okabe, Abiko, both of Japan

[73] Assignee: Mitsubishi Gas Chemical Company, Inc., Tokyo, Japan

[21] Appl. No.: 661,323

[22] Filed: Oct. 16, 1984

[30] Foreign Application Priority Data

Oct. 21, 1983 [JP] Japan ................................ 58-197308

[51] Int. Cl.$^3$ .............................................. C08L 71/04
[52] U.S. Cl. ..................................... 525/397; 525/132
[58] Field of Search ............................... 525/132, 397

Primary Examiner—Paul R. Michl
Attorney, Agent, or Firm—Wenderoth, Lind & Ponack

[57] ABSTRACT

A polyphenylene ether resin composition comprising
(A) a polyphenylene ether resin and
(B) poly(epsilon-caprolactone).

5 Claims, No Drawings

POLYPHENYLENE ETHER RESIN COMPOSITION

This invention relates to a polyphenylene ether resin composition. More specifically, it relates to a polyphenylene ether resin composition having excellent impact strength and mold releasability which comprises a polyphenylene ether resin and poly(epsiloncaprolactone).

Polyphenylene ether resins have excellent heat resistance, and their extrusion and molding require high temperatures. Extrusion and molding at high temperatures deteriorate the polyphenylene ether resins, and thus degrade their inherent excellent properties. Furthermore, the polyphenylene ether resins have low impact strength and when used as such they only show insufficient impact strength for practical applications. To remedy these defects of the polyphenylene ether resins, U.S. Pat. No. 3,383,435 discloses a resin composition comprising a polyphenylene ether resin and an aromatic vinyl resin. Blending of the polyphenylene ether with the aromatic vinyl resin can reduce the temperature required for extrusion and molding. If a rubber-modified polystyrene resin is used as the aromatic vinyl resin, the resulting resin composition has increased impact strength. However, such a resin composition is not at all improved in mold releasability during molding, and the improvement of its impact strength is not sufficient.

Various resin compositions have been proposed to increase the impact strength of polyphenylene ether resins. For example, U.S. Pat. No. 3,660,531 discloses a resin composition comprising polyphenylene ether, polystyrene and rubber. U.S. Pat. No. 3,994,856 discloses a resin composition comprising polyphenylene ether, polystyrene and an elastomeric A-B-A' type block copolymer. U.S. Pat. No. 4,128,602 discloses a resin composition which comprises polyphenylene ether, polystyrene and rubber and in which the maximum mean diameter of the dispersed rubber particles is about 2 microns. U.S. Pat. No. 4,128,603 discloses a resin composition which comprises polyphenylene ether and high-impact polystyrene and in which the high-impact polystyrene contains 22 to 80% by weight of elastomer gel particles. Japanese Patent Publication No. 8139/1982 discloses a resin composition comprising polyphenylene ether, polystyrene and acrylic resin-modified ABS. None of these resin compositions have achieved a simultaneous improvement of impact strength and mold releasability.

Japanese Laid-Open Patent Publication No. 38952/1974 discloses a resin composition comprising polyphenylene ether and a polyester of the general formula

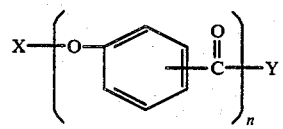

in which the meta-form/para-form ratio in the recurring structural units is from 100/0 to 40/60. Japanese Laid-Open Patent Publication No. 50,050/1974 discloses a resin composition comprising polyphenylene ether and a polyester obtained by reacting a ducaroxylic acid or its ester with a dihydric alcohol or a dihydric phenol.

These prior resin compositions were proposed for improving moldability and surface appearance.

It is an object of this invention to provide a novel polyphenylene ether resin composition.

Another object of this invention is to provide a novel polyphenylene ether resin composition having excellent impact strength and mold releasability.

Further objects and advantages of this invention will become apparent from the following description.

These objects and advantages of the invention are achieved by a polyphenylene ether resin composition comprising (A) a polyphenylene ether resin and (B) poly(epsilon-caprolactone).

The polyphenylene ether resin (A) constituting the resin composition of this invention denotes a polyphenylene ether polymer and a blend of a polyphenylene ether polymer with another resin and/or an elastomer. The polyphenylene ether polymer herein means a homo- or co-polymer of phenylene ether, and a grafted phenylene ether polymer obtained by grafting an aromatic vinyl compound to such a homo- or co-polymer.

Preferably, the homopolymer or copolymer of polyphenylene ether is obtained by polycondensing a monocyclic phenol represented by the following formula

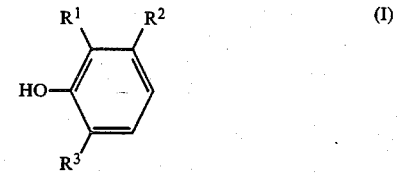

wherein $R^1$ represents a lower alkyl group having 1 to 3 carbon atoms, and $R^2$ and $R^3$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (I) denotes methyl, ethyl, n-propyl and iso-propyl groups.

Examples of the monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Accordingly, examples of polyphenylene ether resins obtained by polycondensing these monocyclic phenols include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

Preferred as the aforesaid grafted phenylene ether polymer is a graft polymer obtained by grafting an aromatic vinyl compound represented by the following formula (II)

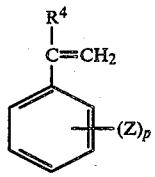

(II)

wherein $R^4$ represents a hydrogen atom or a lower alkyl group, Z represents a halogen atom or a lower alkyl group, and p is 0 or an integer of 1 to 3, to the polyphenylene ether homo- or co-polymer. The grafted phenylene ether polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethylstyrene, n-propylstyrene, iso-propylstyrene, chlorostyrene and bromostyrene.

Especially preferred grafted phenylene ether polymers are a graft polymer obtained by grafting styrene to poly(2,6-dimethyl-1,4-phenylene)ether and a grafted phenylene ether polymer obtained by grafting styrene to 2,6-dimethylphenol/2,3,6-trimethylphenol copolymer.

Polystyrene resins are preferred as the other resin to be blended with the polyphenylene ether resin. For example, those which contain at least 25% by weight of structural units of the following formula

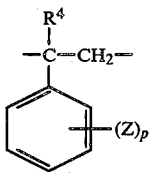

(III)

wherein $R^4$, Z and p are as defined with regard to formula (II), are preferred.

The lower alkyl group for $R^4$ and Z in general formula (III) is preferably an alkyl group having 1 to 3 carbon atoms, such as methyl, ethyl, n-propyl and isopropyl.

The halogen atom in general formula (III) is preferably chlorine or bromine.

The structural units of general formula (III) are derived from a styrene monomer of the above formula (II).

Examples of preferred polystyrene resins are polystyrene, polychlorostyrene, high-impact polystyrene (rubber-modified polystyrene), styrene/acrylonitrile copolymer, styrene/butadiene copolymer, styrene/butadiene/acrylonitrile copolymer, styrene/alphamethylstyrene copolymer and styrene/butadiene resinous block copolymer. They may be used either singly or in combination.

Polymers having a Young's modulus at room temperature of $10^5$ to $10^9$ dynes/cm$^2$ (0.1 to 1020 kg/cm$^2$) in accordance with the definition given in A. V. Tobolsky, "Properties and Structures of Polymers" (John Wiley & Sons, Inc., 1960), pages 71 to 78 may be used as the elastomer to be blended with the polyphenylene ether resin.

Examples of such elastomers include A-B-A' type elastomeric block copolymers (wherein A and A' are blocks resulting from polymerization of an aromatic vinyl compound, and B is a block resulting from polymerization of a conjugated diene), A-B'-A' type elastomeric block copolymers (wherein A and A' are the same as defined above, and B' is a block resulting from hydrogenation of the block B above), polybutadiene, polyisoprene, an elastomeric copolymer of a diene compound and an aromatic vinyl compound, nitrile rubber, ethylene/propylene copolymer, ethylene/propylene/diene copolymers (EPDM), thiokol rubbers, polysulfide rubbers, acrylic rubbers, a grafted product of butyl rubber and polyethylene, polyester elastomers, polyamide elastomers and polyurethan elastomers. Of these, the A-B-A' type and A-B'-A' type elastomeric block copolymers are preferred, and those in which the molecular weight of the block B or B' is higher than the total sum of the molecular weight of the block A and the molecular weight of the block A' are especially preferred. The block A or A' is, for example, a homo-block or co-block resulting from the polymerization of a monocyclic aromatic vinyl compound such as styrene, alpha-methylstyrene, vinyltoluene, vinylxylene or ethylvinylxylene, or a polycyclic aromatic vinyl compound such as vinylnaphthalene, and preferably has a molecular weight of about 2,000 to about 100,000. The block B is, for example, an elastomeric block resulting from the polymerization of a conjugated diene compound such as 1,3-butadiene, 2,3-dimethylbutadiene, isoprene and 1,3-pentadiene. The block B' results from the hydrogenation of the block B. The block B or B' preferably has a molecular weight of about 25,000 to about 1,000,000.

The other resin such as the polystyrene-type resin can be blended in an amount of 5 to 95 parts by weight, preferably 15 to 85 parts by weight, per 100 parts by weight of the polyphenylene ether resin and the other resin combined. The elastomer can be incorporated in an amount of 5 to 98 parts by weight, preferably 15 to 95 parts by weight, per 100 parts by weight of the polyphenylene ether resin and the elastomer combined.

Poly(epsilon-caprolactone) is a polymer of epsilon-caprolactone represented by the following formula (IV).

(IV)

The end groups of the polymer differ depending upon the type of the initiator used in ring-opening polymerization of epsilon-caprolactone. When a monohydric alcohol is used as the initiator, a polymer is obtained in which only one of the end groups is a hydroxyl group. When a dihydric alcohol is used as the initiator, a polymer having hydroxyl groups at both ends is obtained. When water is used as the initiator, one end group is a hydroxyl group, and the other end group is a carboxyl group. When the initiator is a trihydric or higher alcohol, branched poly(epsilon-caprolactone) results. A typical species of poly(epsilon-caprolactone) is represented by the following general formula.

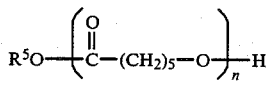

$$R^5O \left[ \begin{matrix} O \\ \| \\ C-(CH_2)_5-O \end{matrix} \right]_n H \qquad (V)$$

wherein n is a positive number showing the degree of polymerization, and $R^5$ represents hydrogen or an alkyl, allyl, aryl or aralkyl group.

The alkyl group for $R^5$ is preferably one having 1 to 10 carbon atoms such as methyl, ethyl, propyl, butyl, pentyl, heptyl, hexyl, octyl, nonyl and decyl.

A monocyclic carboxylic aromatic group such as phenyl is preferred as the aryl group.

Preferred aralkyl groups are those in which the alkyl moiety has 1 to 5 carbon atoms and the aryl moiety is a monocyclic aromatic group, such as benzyl, phenylethyl, phenylpropyl, phenylbutyl and phenylpentyl.

Poly(epsilon-caprolactone) may be used as various polymers having different properties attained by adjusting the degree of polymerization. Generally, the higher the molecular weight, the better the properties of poly(epsilon-caprolactone). On the other hand, the polymer becomes brittle if its molecular weight is low. As is well known, if it has an extremely low molecular weight, it does not show the properties of a resin.

Poly(epsilon-caprolactone) polymers used in this invention are known and some of them are commercially available.

Poly(epsilon-caprolactone) which can be used as an essential ingredient of the resin composition of this invention does not necessarily have to show the properties of a resin by itself. For the purpose of this invention, therefore, it may be a polymer having an average molecular weight ($\overline{Mn}$) of at least 3,000, preferably at least 5,000, more preferably at least 10,000. If the poly(epsilon-caprolactone) has an average molecular weight of less than 3,000, an increase in impact strength cannot be expected in the resulting polyphenylene ether resin composition, and rather it shows a decreasd heat distortion temperature. Such a composition is not practically desirable.

The amount of the poly(epsilon-caprolactone) in the polyphenylene ether resin composition of this invention is 0.1 to 10 parts by weight, preferably 0.5 to 7 parts by weight, more preferably 1 to 5 parts by weight, per 100 parts by weight of the resin components of the composition. If it exceeds the specified upper limit, there is no appreciable effect of increasing the impact strength of the composition, and moreover, undesirable phenomena such as the surface peeling of a molded article prepared from the composition occur.

According to the purpose for which the resin composition of this invention is ultimately used, it is possible to incorporate other ingredients such as additives and fillers in the resin composition. Examples of the other ingredients include stabilizers such as sterically hindered phenols, organic phosphites, phosphonites, phosphonous acid, cyclic phosphonites, hydrazine derivatives, amine derivatives, carbamate derivatives, thioethers, phosphoric triamide, benzoxazole derivatives and metal sulfides; ultraviolet absorbers such as benzotriazole derivatives, benzophenone derivatives, salicyclate derivatives, sterically hindered amines, oxalic acid diamide derivatives and organic nickel complexes; lubricants such as olefin waxes typified by polyethylene or polypropylene wax; phosphate-type fire retardants typified by triphenyl phosphate, tricresyl phosphate, cresyl diphenyl phosphate, a phosphate obtained from a mixture of isopropylphenol and phenol, and a dimer of cresyl diphenyl phosphate; bromine-containing fireretardants typified by decabromobiphenyl, pentabromotoluene, brominated polystyrene and decabromobiphenyl ether; pigments typified by titanium dioxide, zinc oxide and carbon black; inorganic fillers such as glass fibers, glass beads, asbestos, wollastonite, mica, talc, clay, calcium carbonate and silica; metal flakes typified by copper, nickel, aluminum and zinc flakes; metallic fibers such as aluminum fibers, aluminum alloy fibers, brass fibers and stainless steel fibers; and organic fillers typified by carbon fibers and aromatic polyamide fibers. The amounts of these other ingredients may vary depending upon the types of the compounds or the purpose for which they are added.

The following Examples and Comparative Examples specifically illustrate the resin composition of this invention. Unless otherwise specified, all parts and percentages in these examples are by weight.

EXAMPLE 1 AND COMPARATIVE EXAMPLE 1

Sixty parts of 2,6-dimethylphenol/2,3,6-trimethylphenol copolymer (containing 5 mole % of 2,3,6-trimethylphenol) having an inherent viscosity, measured at 25° C. in chloroform, of 0.52 dl/g, 32 parts of high-impact polystyrene (the inherent viscosity of the polystyrene matrix measured at 25° C. using chloroform as a solvent, 0.89 dl/g; the gel content analyzed by using methyl ethyl ketone as a solvent, 16.5%; the weight average rubber particle diameter measured by a Coulter Counter, 3.3 microns), 2 parts of polystyrene/polybutadiene/polystyrene block copolymer (the weight ratio of the polystyrene block to the polybutadiene block, 30:70; the viscosity of a 20% toluene solution of the copolymer measured at 25° C. by a Brookfield viscometer Model RVT, 1500 cps), 1 part of ethylene/propylene copolymer (reduced specific viscosity measured at 135° C. in a decalin solvent in a concentration of 0.1 g/100 ml, 3.0; glass transition temperature −49° C.), 5 parts of poly(epsilon-caprolactone) (weight average molecular weight, 40000; number average molecular weight, 18000; commercially available under the trade name "PCL-700" from Union Carbide Corporation), 6 parts of triphenyl phosphate, 7 parts of titanium dioxide (having a rutile-type crystal structure; particle diameter 0.3 to 0.5 micron), 0.4 part of hydrogenated bisphenol A phosphite resin and 0.6 part of 2,2'-methylene-bis(4-methyl-6-tert-butylphenol) were mixed by means of a Henschel mixer. The mixture was extruded and pelletized by a twin-screw extruder (Model AS-30 made by Nakatani Machinary Co., Ltd.) in which the maximum temperature of the cylinder was set at 290° C. Then, the pellets were molded under an injection pressure of 1050 kg/cm² by an injection molding machine (Model SJ-35B made by Meiki Co., Ltd.) in which the maximum temperature of the cylinder was set at 280° C. to form test specimens. The number of shots of the test specimens which were formed during the time period from the first spraying of a mold releasing agent onto the surface of the mold at the start of the molding operation until the next spraying of the mold releasing agent became necessary was measured and made a measure of the releasability of the molded articles from the mold (mold releasability). The test specimens were used to measure Izod impact strength.

The above operation was repeated except that poly(epsilon-caprolactone) was not used and the amount of the high-impact polystyrene was changed to 37 parts (Comparative Example 1).

Table 1 shows the Izod impact strengths and mold releasabilities of the products obtained.

TABLE 1

| | Notched Izod impact strength (⅛ inch thick, kg-cm/cm) | Mold releasability |
|---|---|---|
| Example 1 | 32.2 | More than 15 shots |
| Comparative Example 1 | 1.8 | 5–6 shots |

It is seen from the results shown in Table 1 that the use of poly(epsilon-caprolactone) increases the Izod impact strength and mold releasability of the polyphenylene ether resin.

EXAMPLE 2

Example 1 was repeated except that the amount of the high-impact polystyrene was changed to 30 parts, and the amount of poly(epsilon-caprolactone), to 7 parts. The Izod impact strength and mold releasability of the product are shown below.

Notched Izod impact strength: 23.4 kg-cm/cm.
Mold releasability: more than 15 shots.

EXAMPLE 3

Example 1 was repeated except that poly(epsilon-caprolactone) having a number average molecular weight of 10,000 (tradename "PCL-300", a product of Union Carbide Corporation) was used instead of the poly(epsilon-caprolactone) used in Example 1. The Izod impact strength and mold releasability of the product are shown below.

Notched Izod impact strength: 28.8 kg-cm/cm.
Mold releasability: more than 15 shots.

EXAMPLE 4 AND COMPARATIVE EXAMPLE 2

Example 1 was repeated except that 42 parts of the same 2,6-dimethylphenol/2,3,6-trimethylphenol copolymer as used in Example 1, 51 parts of the same high-impact polystyrene as used in Example 1, 3.5 parts of the same polystyrene/polybutadiene/polystyrene block copolymer as used in Example 1, 1 part of the same ethylene/propylene copolymer as used in Example 1, 2.5 parts of the same poly(epsilon-caprolactone) as used in Example 1, 7 parts of the same titanium dioxide as used in Example 1, 0.4 part of tetrakis(2,4-di-tert-butylphenyl)-4,4'-biphenylene diphosphonite and 0.6 part of 2,6-di-tert-butyl-p-cresol were used instead of the starting ingredients used in Example 1.

The above operation was repeated except that the poly(epsilon-caprolactone) was not used, and the amount of the high-impact polystyrene was changed to 53.5 parts (Comparative Example 2).

Table 2 shows the Izod impact strengths and mold releasabilities of the products obtained.

TABLE 2

| | Notched Izod impact strength (kg-cm/cm) | Mold releasability |
|---|---|---|
| Example 4 | 22.6 | More than 15 shots |
| Comparative Example 2 | 17.4 | 5–6 shots |

TABLE 2-continued

| | Notched Izod impact strength (kg-cm/cm) | Mold releasability |
|---|---|---|

EXAMPLE 5 AND COMPARATIVE EXAMPLE 3

Ninety-five parts of the same 2,6-dimethylphenol/2,3,6-trimethylphenol copolymer as used in Example 1, 5 parts of the same poly(epsilon-caprolactone) as used in Example 1 and 9.5 parts of triphenyl phosphate were mixed by a Henschel mixer. The mixture was extruded and pelletized by a twin-screw extruder (Model AS-30) in which the maximum temperature of the cylinder was set at 305° C. The pellets were then molded under an injection pressure of 1050 kg/cm² by an injection molding machine (Model SJ-35B) in which the cylinder temperature was set at 300° C. to form test specimens.

The above operation was repeated except that poly(epsilon-caprolactone) was not used and the amount of 2,6-dimethylphenol/2,3,6-trimethylphenol copolymer was changed to 100 parts (Comparative Example 3).

Table 3 shows the Izod impact strengths and mold releasabilities of the products.

TABLE 3

| | Notched Izod impact strength (kg-cm/cm) | Mold releasability |
|---|---|---|
| Example 5 | 11.0 | More than 15 shots |
| Comparative Example 3 | 8.0 | 5–6 shots |

EXAMPLE 6 AND COMPARATIVE EXAMPLE 4

Ninety-five parts of poly(2,6-dimethyl-1,4-phenylene)ether having an inherent viscosity, measured at 25° C. in chloroform, of 0.50 dl/g and 5 parts of the same poly(epsilon-caprolactone) as used in Example 1 were mixed by means of a turnable mixer. The mixture was extruded by a twin-screw extruder (Model AS-30) in which the maximum temperature of the cylinder was set at 315° C. The pellets were then molded under an injection pressure of 1,310 kg/cm² by an injection molding machine (Model SJ-35B) whose cylinder temperature was set at 320° C. to form test specimens.

The above operation was repeated except that 100 parts of the poly(2,6-dimethyl-1,4-phenylene)ether was used without using poly(epsilon-caprolactone) (Comparative Example 4). Table 4 shows the Izod impact strengths and mold releasabilities of the products.

TABLE 4

| | Notched Izod impact strength (kg-cm/cm) | Mold releasability |
|---|---|---|
| Example 6 | 11.7 | More than 15 shots |
| Comparative Example 4 | 7.5 | 5–6 shots |

What we claim is:

1. A polyphenylene ether resin composition comprising
   (A) a polyphenylene ether resin and (B) poly(epsilon-caprolactone).

2. The resin composition of claim 1 wherein the polyphenylene ether resin is a homopolymer of phenylene ether, a copolymer of phenylene ether, a grafted phenylene ether polymer, or a blend of any one of these polymers with another resin or an elastomer.

3. The resin composition of claim 2 wherein the other resin is a polystyrene resin.

4. The resin composition of claim 2 wherein the elastomer has a Young's modulus at room temperature of $10^5$ to $10^9$ dynes/cm$^2$.

5. The resin composition of claim 1 wherein the amount of the poly(epsilon-caprolactone) is 0.1 to 10 parts by weight per 100 parts by weight of the resin components.

* * * * *